United States Patent
Kazerooni et al.

(12) 
(10) Patent No.: US 6,422,329 B1
(45) Date of Patent: Jul. 23, 2002

(54) HUMAN ASSISTED WALKING ROBOT

(76) Inventors: Homayoon Kazerooni, 2806 Ashby Ave., Berkeley, CA (US) 94720; Peter Neubaus, 2514 Dana St., Berkeley, CA (US) 94704

(*) Notice: Subject to any disclaimer, the term of this patent is extended or adjusted under 35 U.S.C. 154(b) by 0 days.

(21) Appl. No.: 09/439,621

(22) Filed: Nov. 12, 1999

(51) Int. Cl.⁷ .............................................. B62D 51/04
(52) U.S. Cl. ........................ 180/19.3; 180/8.6; 180/8.4; 280/47.2; 280/47.31
(58) Field of Search ........................... 180/8.1, 8.6, 8.4, 180/8.2, 8.3, 19.1, 19.3; 280/47.2, 47.31, 47.131; 901/1

(56) References Cited

U.S. PATENT DOCUMENTS

| | | | |
|---|---|---|---|
| 3,554,309 A | * 1/1971 | Abercrombie ................. | 180/8 |
| 4,106,583 A | * 8/1978 | Nemeth ..................... | 180/65 E |
| 4,356,875 A | * 11/1982 | Clune ......................... | 180/13 |
| 4,709,771 A | * 12/1987 | Basham et al. .............. | 180/6.5 |
| 4,811,988 A | 3/1989 | Immel | |
| 4,840,242 A | * 6/1989 | Chih et al. .................... | 180/8.1 |
| 5,211,254 A | 5/1993 | Harris, III et al. | |
| 5,284,218 A | 2/1994 | Rusher, Jr. | |
| 5,465,801 A | 11/1995 | Hoover | |
| 5,807,011 A | * 9/1998 | Hong et al. ................... | 403/62 |
| 6,173,799 B1 | * 1/2001 | Miyazaki et al. .......... | 180/19.3 |

FOREIGN PATENT DOCUMENTS

DE 32 42 880 * 6/1983

OTHER PUBLICATIONS

*Off-The-Road Locomotion*, Research and Development in Terramechanics by M.G. Bekker. Ann Arbor, The Unibersity of Michigan Press 1960.
*Machines That Walk: The Adaptive Suspension Vehicle*, Shin–Min Song and Kenneth J. Waldron, The MIT Press, Cambridge, Massachusetts, London, England. (Cpoyright 1989).
*Mecant I: A Six Legged Walking Machine For Research Purposes In Outdoor Environment*, K.K. Hartikainen, A.J. Halme of Automation Technology Laboratory, Helsinkin University of Technology.
Espoo, Finland SF–02150 And H. Lehtinen and K.O. Koskinen of Laboratory of Electrical and Automation Engineering Technical Research Centre of Finland, Espoo, Finland SF–02150.
0–8186–2720–4/92 Copyright 1992 IEEE.

* cited by examiner

*Primary Examiner*—Avraham H. Lerner
(74) *Attorney, Agent, or Firm*—Gregory Scott Smith; Mitchell S. Rosenfeld (57) ABSTRACT

A human assisted walking robot formed by a motor, a cargo bin, a pair of legs mounted to the carrier; and a stabilizing support mounted at its proximal end to the carrier and having a wheel rotatably mounted to the distal end. The motor drives the first and second leg members resulting in a walking motion. Each leg is formed by a thigh link and a shank link. A four-bar linkage is coupled between the motor and the thigh and shank of each leg so that rotational motion generated by the motor produces a walking motion by the legs.

47 Claims, 9 Drawing Sheets

HUMAN ASSISTED WALKING ROBOT

FIELD OF THE INVENTION

This invention relates to the field of robotics, specifically how robots can aid humans in transporting heavy loads over rough terrain.

BACKGROUND OF THE INVENTION

The task of transporting heavy objects over rough terrain has previously been solved by the use of wheeled and treaded vehicles. These vehicles include jeeps, motorcycles, tanks, and All-Terrain-Vehicles (ATV). The limitations of these devices are the types of terrain that they can operate on, and their maneuverability on that terrain. On roads or other relatively smooth terrain, these devices are successful. But when the terrain is very irregular, as in jungles, these devices become useless. Another limitation of these devices is due to their size. The size problem has been solved by a class of inventions called motorized wheelbarrows and carts (as in U.S. Pat. Nos. 5,465,801; 5,284,218; 5,211,254; and 4,811,988). These inventions all use wheels as the means to contact the ground and provide the locomotion. On smooth roads, wheel devices provide suitable means for locomotion. On very rough and irregular terrain wheeled devices consume a significant amount of power, provide poor ride quality, damage the terrain, and encounter problems with traction. Often, these wheeled devices cannot even traverse the rough terrain.

The solution to providing means for locomotion on rough and irregular terrain comes from legged robots and machines. Legged versus wheeled locomotion has the advantages of requiring less energy, attaining higher speeds, greater mobility, better isolation from terrain irregularities, and less environmental damage (Bekker 1960; Song and Waldron 1989). The problem with having legged machines navigate through rough terrain is the technology is such that it cannot support a fully autonomous legged machine. A few six-legged machines have been built that can walk on irregular terrain (Adaptive Suspension Vehicle built by Ohio State University, Song and Walkron 1989; MECANT I, Hartikainen et. al 1992) but they are large, bulky, and move slowly.

BRIEF DESCRIPTION OF THE DRAWINGS

The objects and advantages of the Human Assisted Walking Robot (HAWR) will become apparent from the following detailed description of preferred embodiments thereof in connection with the accompanying drawing in which like numerals designate like elements, and in which.

SUMMARY OF THE INVENTION

The present invention solves the problems inherent in wheeled transport vehicles and legged robots by providing a human assisted walking robot formed by a motor, a cargo bin, a pair of legs mounted to the carrier; and a stabilizing support mounted at its proximal end to the carrier and having a wheel rotatably mounted to the distal end. The motor drives the first and second leg members resulting in a walking motion. Each leg is formed by a thigh link and a shank link. A four-bar linkage is coupled between the motor and the thigh and shank of each leg so that rotational motion generated by the motor produces a walking motion by the legs.

The present invention has other objects and advantages which are set forth in the Description of the Preferred Embodiment. The features and advantages described in the specification, however, are not all inclusive, and particularly, many additional features and advantages will be apparent to one of ordinary skill in the art in view of the drawings, specification and claims herein.

DESCRIPTION OF THE PREFERRED EMBODIMENT

Figure 1:
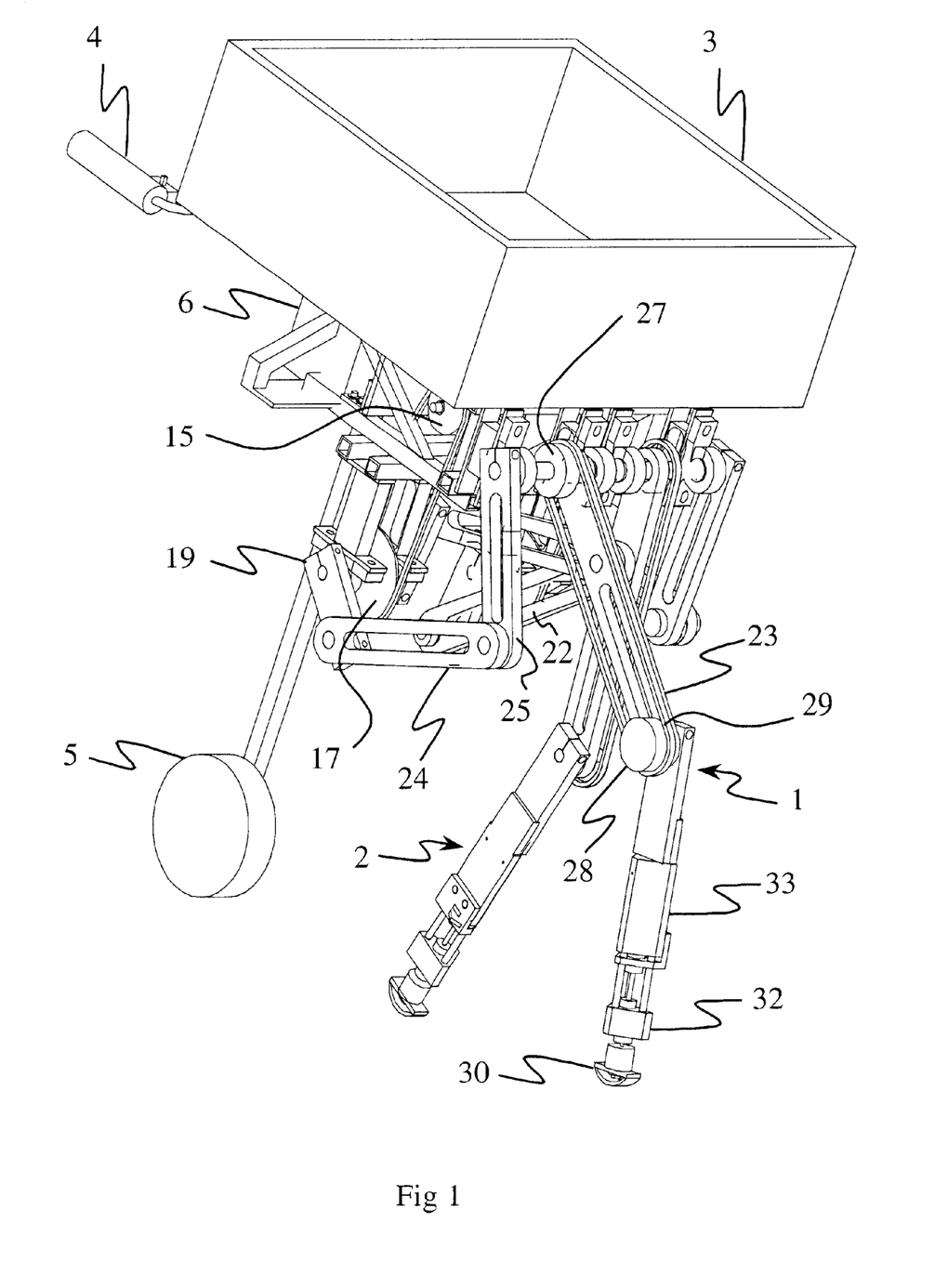
FIG. 1 is an isometric CAD drawing showing the entire HAWR as viewed from the front right side of the HAWR.
Figure 2:
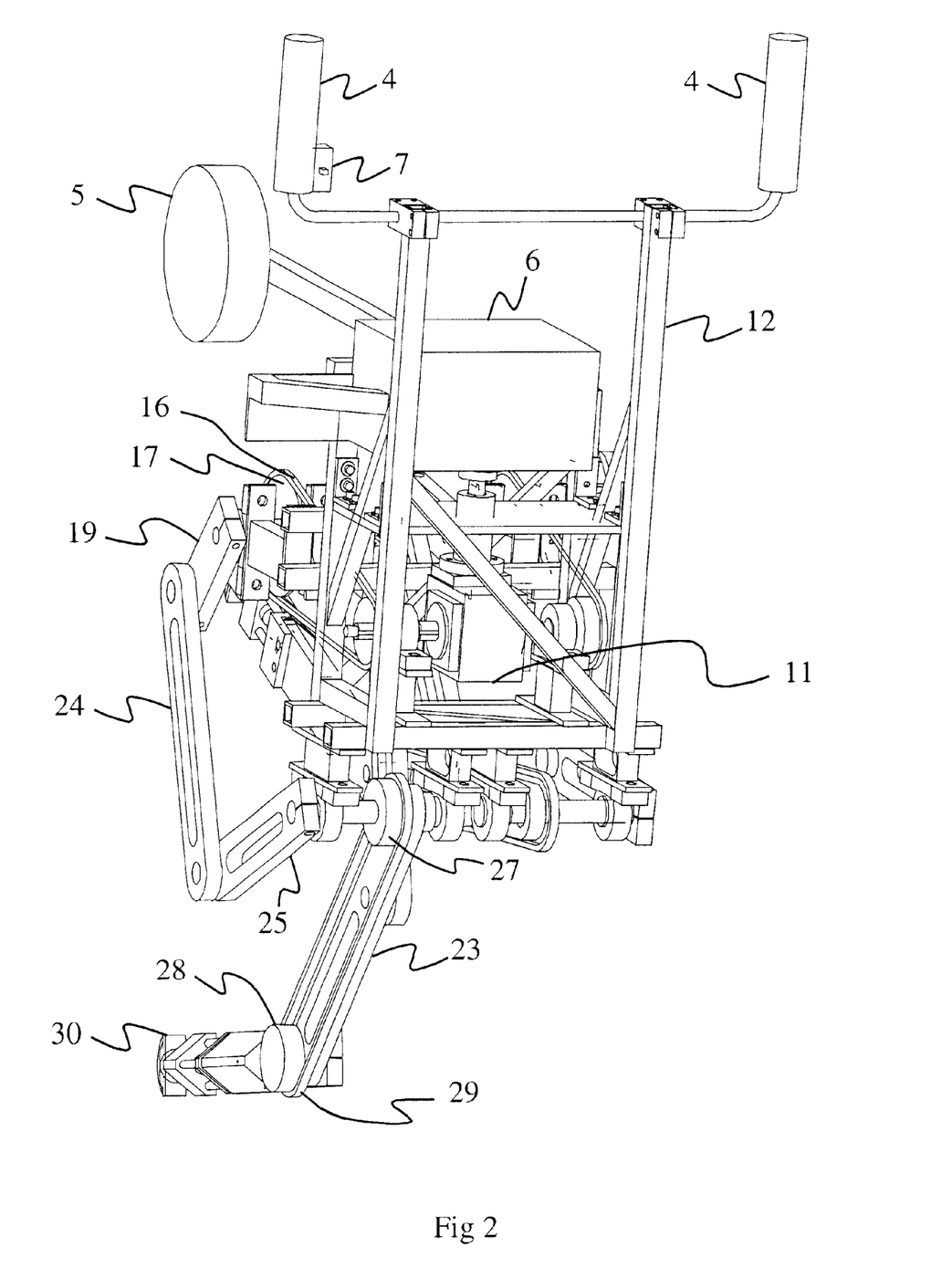
FIG. 2 is an isometric CAD drawing showing the HAWR as viewed from the top right side of the HAWR. The cargo bin has been removed for a better view of the underlying components.

Depicted in FIG. 1. is a Human Assisted Walking Robot (HAWR) designed to transport loads over rough terrain. The HAWR uses two legs, a right leg 1 and a left leg 2, to support the load, carried in a cargo bin 3, The human operator grasps the HAWR at a set of handles 4 in FIG. 2 to provide stabilizing forces and navigate the HAWR. By grasping the handles 4, the operator can provide stabilizing forces needed to keep the machine balanced upright. A wheel 5, or multiple wheels, can be used to help the operator stabilize the robot. In the preferred embodiment no wheel is used. The user controls a power unit 6 by means of an apparatus 7 which then controls the walking speed of the robot. Power unit 6 can be any type of motor, with the preferred type being an internal combustion engine.

In general there are two ways to control the speed of the HAWR:

In the first method, the direct control, apparatus 7 directly adjusts the flow of power from power unit 6. For example if power unit 6 is an internal combustion engine, then apparatus 7 controls the engine throttle and therefore the torque output of the engine. Or if power unit 6 is an electric motor, then the apparatus 7 could be a device, such as a potentiometer or rheostat, that controls the output torque of the motor.

Figure 3:
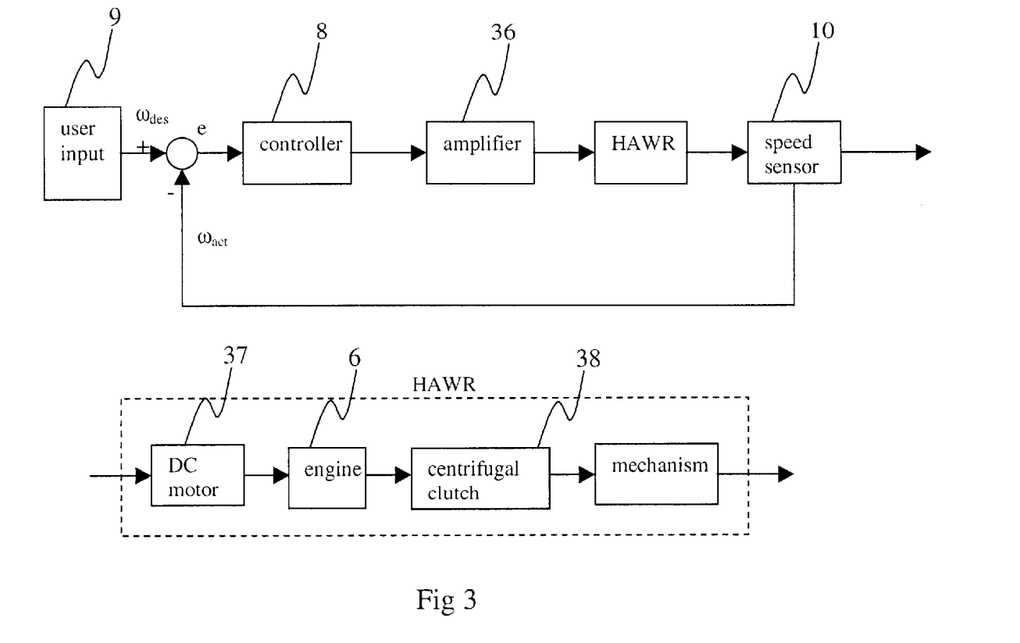
FIG. 3 is a schematic for the controller circuit.

In the second method, indirect control, a feedback controller 8 in FIG. 3 is employed to regulate the walking speed of the HAWR similar to cruise control in automobiles. The input to controller 8 is directly assigned by the operator via a transducer 9. Transducer 9 can be a speed setting switch, a force sensor, or any other transducer device that is able to get the operator's input. In the preferred embodiment, the transducer 9 is a multiple position switch, where each position corresponds to a different speed. A tachometer, encoder, or any other device which can determine the speed of the walking robot is employed as the speed sensor 10. In the preferred design, the speed sensor 10 is a tachometer. Also in the preferred design, feedback controller 8 is a microprocessor, but it could be an electronic circuit instead. An electronic amplifier 36 is used to amplify the command from the computer 8. This amplifier, in return, drives a small DC motor 37. Motion of the DC motor 37 allows for adjustment of the engine throttle. The engine 6 then drives the HAWR mechanism through a centrifugal clutch 38.

Figure 4:
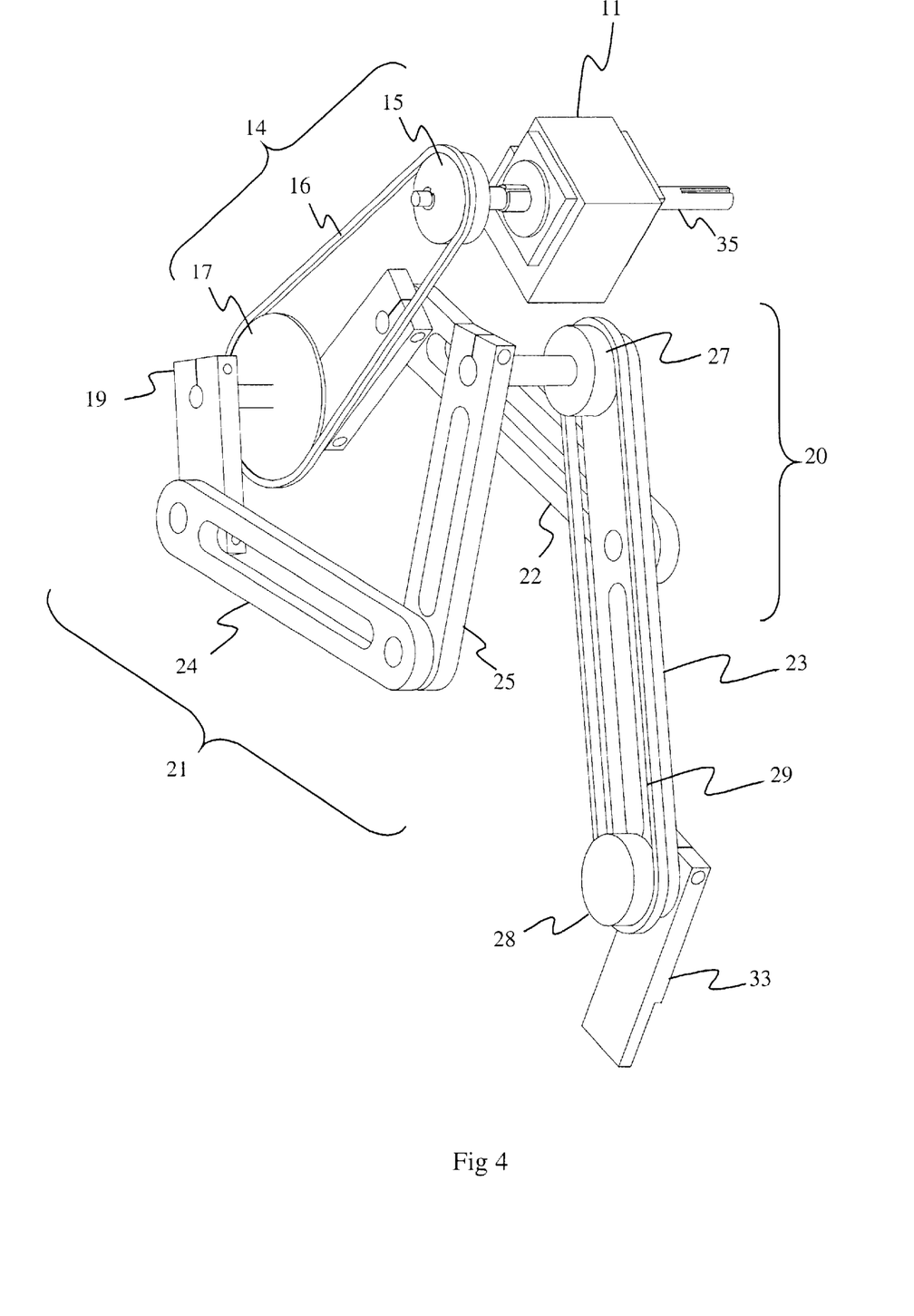
FIG. 4 is an isometric CAD drawing showing only the transmission and the double four-bar linkage for the right leg of the machine. The components associated with the left leg of the machine have been omitted for clarity.
Figure 5:
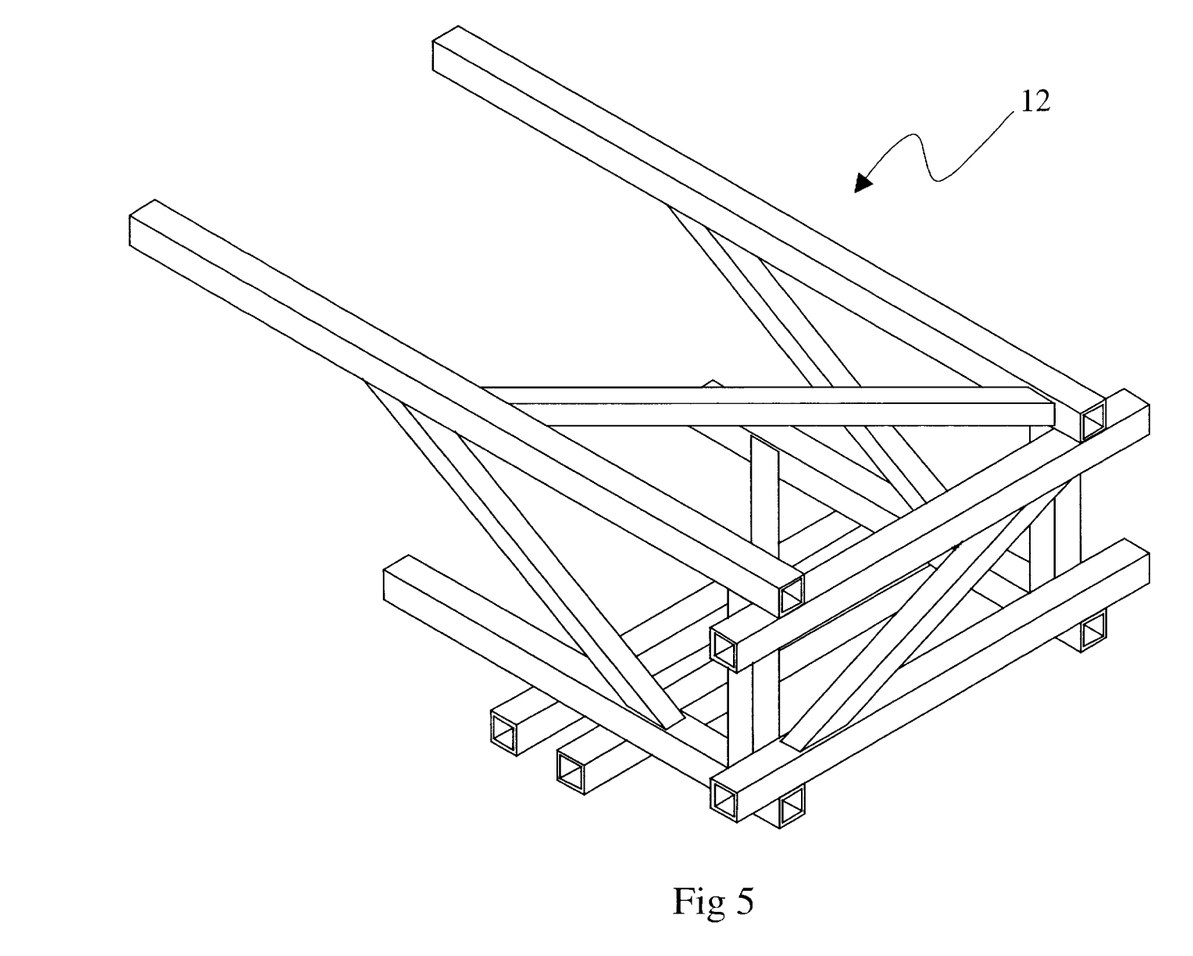
FIG. 5 is an isometric CAD drawing showing the rigid frame of the machine.
Figure 6:
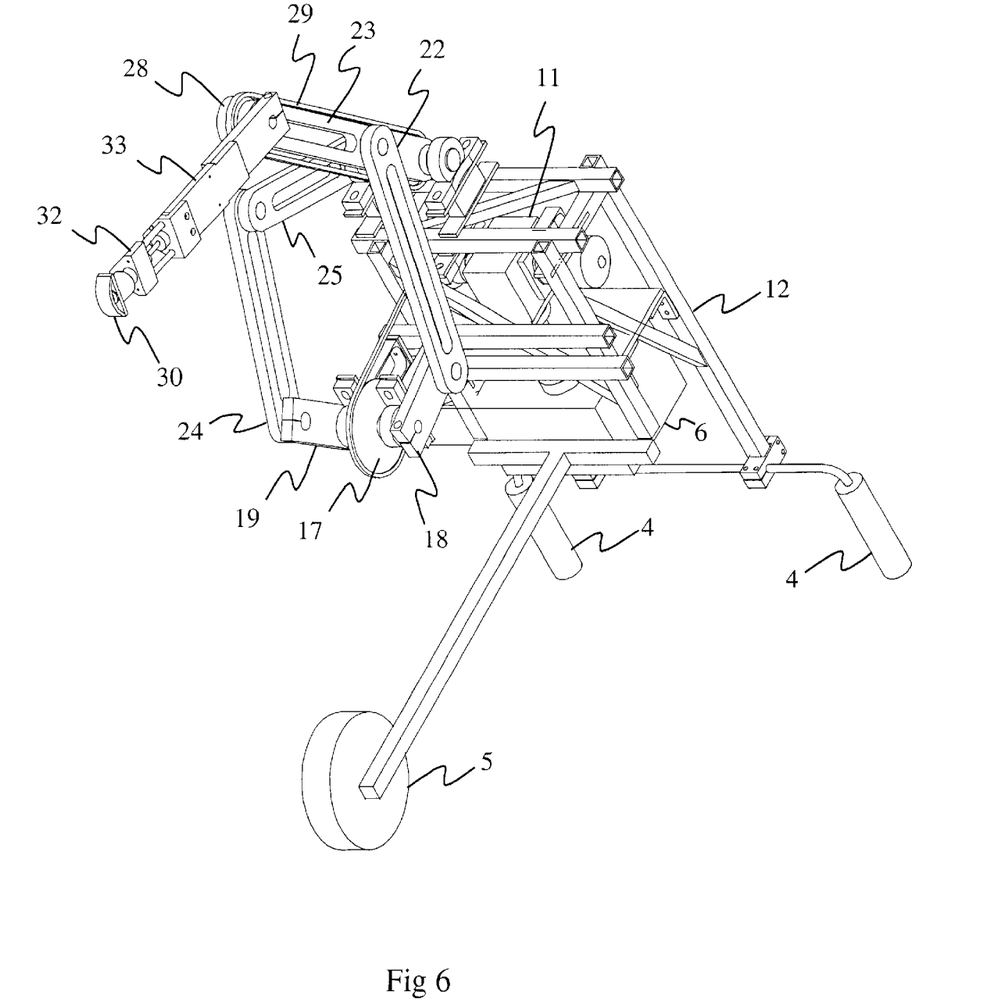
FIG. 6 is an isometric CAD drawing showing the HAWR as viewed from below on the front left side of the HAWR. The left leg and its driving hardware and the cargo bin are not shown so that the right leg and its driving hardware can be viewed more easily.
Figure 7:
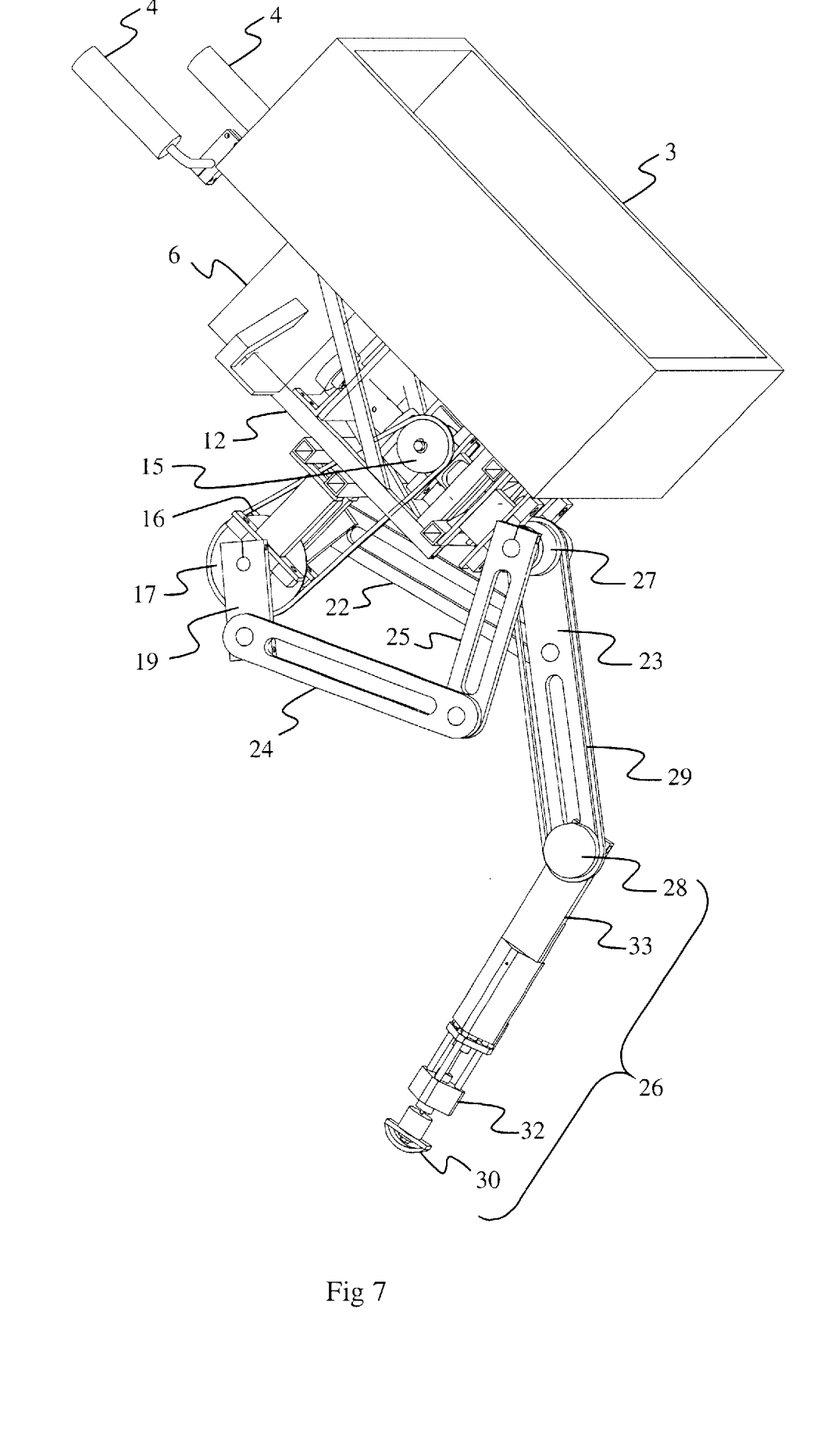
FIG. 7 is an isometric CAD drawing showing the HAWR as viewed from the front right side of the HAWR. The left leg and its driving hardware are not shown so that the right leg and its driving hardware can be viewed more easily.

The following describes the mechanism of HAWR. The power to the walking mechanism of the robot is provided by the onboard power unit 6 in FIG. 2. A clutch is used to disengage the power unit 6 from the rest of the system. This clutch, in many cases is integrated with the power unit. Many two-stroke internal combustion engines are available with centrifugal clutches, which is the preferred design. Depending on the output speed of the power unit 6, a transmission system may be necessary to modulate the rotational speed of the power unit. Because the typical speed of two-stroke internal combustion engines is around 8000 rpm, a transmission 11 is employed to reduce the engine speed. The preferred transmission is a gear type, but it could also be a hydrostatic having a continuous gear ratio with the possibility for forward and reverse settings. The transmission 11 has two output shafts, one to power the left leg 2 of the walking robot, and the other to power the right leg 1 of the walking robot. The power unit 6 and transmission 11 are mounted to rigid frame 12 in FIG. 5. From this point on, the left and right sides of the walking robot are identical, and thus the left leg will be omitted in FIGS. 4, 6, and 7 so that the components can be more easily viewed. The right side of the output shaft of the transmission 11 is used to drive the double four-bar linkages 13 which governs the movement of the right leg 1. The connection between transmission 11 and double four-bar linkage 13 is through a chain and sprocket system 14. A transmission sprocket 15 in FIG. 7 is rigidly connected to the right side of a transmission output shaft 35. A drive chain 16 connects transmission sprocket 15 and a driver sprocket 17. Driver sprocket 17 is rigidly connected to a thigh driver-link 18 and a shank driver-link 19, such that thigh driver-link 18 and shank driver-link 19 rotate with the same speed of driver sprocket 17. This indicates that when the transmission output shaft 35 rotates, both thigh driver-link 18 and shank driver-link 19 rotate also. The angular speed of the thigh driver-link 18 and the shank driver-link 19 depend on the relative size of transmission sprocket 15 and driver sprocket 17. The thigh driver-link 18 and the shank driver-link 19 are considered the inputs to the double four-bar linkage 13. The double four-bar linkage 13 consists of two four-bar linkages:

A thigh linkage 20 which consists of three moving links: the thigh driver-link 18 (input to the linkage 20), a thigh coupler-link 22, and a thigh rocker-link 23 (output of the linkage 20). A full rotation of thigh diver-link 18 causes thigh rocker-link 23 to rock back and forth. In other words the thigh linkage 20 governs the trajectory of the rocking motion of thigh rocker-link 23 in response to continuous rotation of thigh driver-link 18.

A shank linkage 21 which consists of three moving links: the shank driver-link 19 (input to the linkage 21), a shank coupler-link 24, and a shank rocker-link 25 (output of the linkage 21). A full rotation of shank diver-link 19 causes shank rocker-link 25 to rock back and forth. In other words the thigh linkage 21 governs the trajectory of the rocking motion of shank rocker-link 25 in response to continuous rotation of shank driver-link 19. The rocking motion of shank rocker-link 25 is transferred to a shank leg 26 as described below. Rigidly connected to shank rocker-link 25 is an upper sprocket 27. Rigidly connected to shank leg 26 is a lower sprocket 28. A leg chain 29 connects upper sprocket 27 and lower sprocket 28. As shank rocker link 25 rocks, it rotates upper sprocket 27, which rotates lower sprocket 28, which rotates shank leg 26.

The foot 30 is mounted to the end of shank leg 26. Therefore the motion of foot 30 is governed by the double four-bar linkage 13. The two four-bar linkages 20 and 21 (in double four-bar linkage 13) work in conjunction to form a suitable trajectory for the position of foot 30 in FIG. 9, in the vertical plane. The designers must arrive at the proper lengths of the double four-bar linkage links such that a proper trajectory is generated for foot 30.

Figure 9:
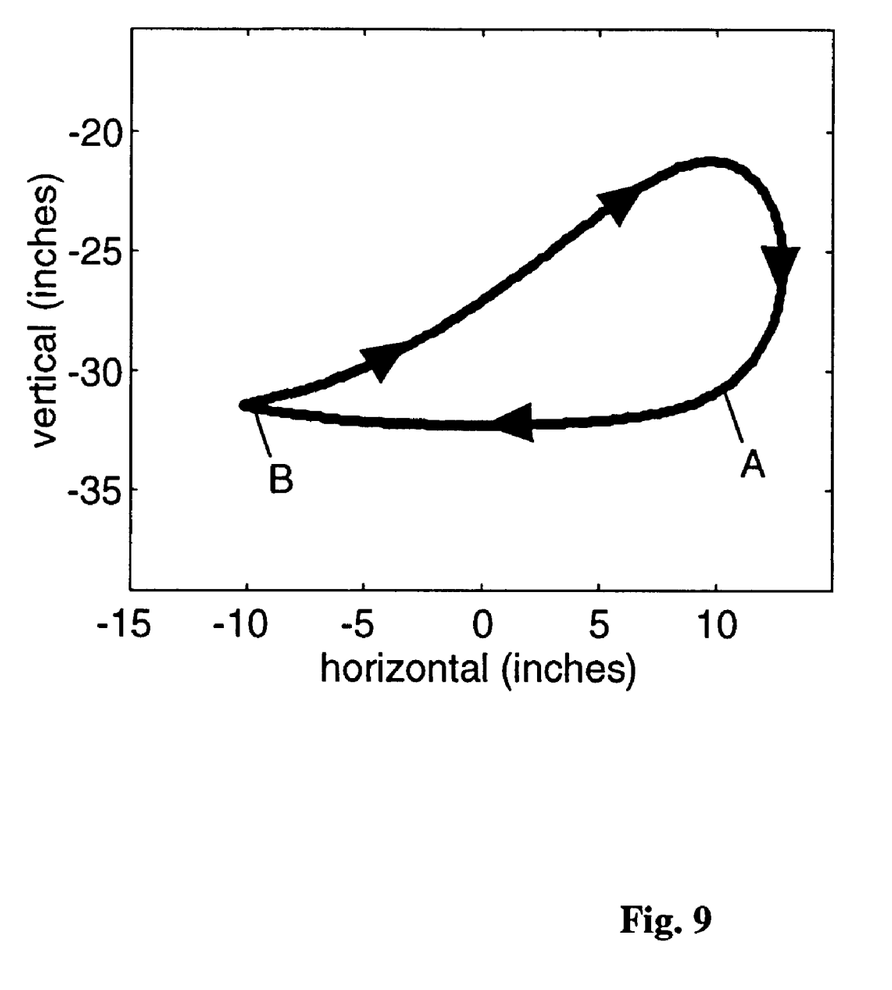
FIG. 9 is a plot of the path of the foot in the vertical plane.

FIG. 9 shows the preferred trajectory for foot 30 relative to rigid frame 12 where it is similar to how humans walk. Imagine the path that a walking human's foot traces out relative to a fixed point on the body, e.g. the hip. The path is relatively flat during the time that the foot was in contact with the ground. If the path we not relatively flat, then it would mean that the human's hips are moving up and down a significant amount during walking. As we know from watching other people walk, the hips stay relatively level during walking, meaning the foot path is relatively flat while the foot is in contact with the ground. When the foot reaches the end of the flat part, i.e. the human's leg is fully extended behind the body, it is time for the foot to come off the ground and move forward for the next step. The path that the foot takes to return forward must lie above the flat portion, or else the foot would bump into the ground. In other words, one must lift one's foot off of the ground while bringing it forward. Referring to FIG. 9, we see that the machine's foot 30 lifts off of the ground as it moves from point B to point A. Also note that the path reaches a height of about 10 inches above the flat portion. This rise corresponds to the lifting of foot 30 10 inches off of the ground. The reason for this rise is so that the machine can step over objects, such as rocks, or onto objects, such as stairs.

As mentioned previously, the designer of the HAWR must arrive at a proper trajectory for the path of foot 30. A proper trajectory has two main properties:

1. For 180 rotation of the input—thigh driver-link 18 and shank driver-link 19, foot 30 travels from A to B and for remaining 180 degree rotation, foot 30 travels from B to A. This means that if the input—thigh driver-link 18 and shank driver-link 19—rotates at constant speed, the time it takes for the foot 30 to go from A to B is the same as the time for the foot 30 to go from B to A.

2. This trajectory must be such that the foot 30 is in contact with the ground from A to B (on the relatively flat portion of the trajectory). And that the return path (from B to A) lies above the flat portion so that the foot does not bump into the ground.

The motion of the foot 30 (end point of right leg 1) has been described. The trajectory of the end point of left leg 2 is identical to that of the end point of the right leg because the motion generating mechanisms are identical for both sides. However the left foot double four-bar linkage is 180° out of phase with the motion of the right double four-bar linkage. The means that when the foot 30 of the right leg 1 is at point A, the foot of the left leg will be at point B. The opposite is also true; when the left leg is at point A, the right leg will be at point B. This is similar to human walking; the left leg is basically doing the same thing as the right leg, except half a step (180° of the cycle) out of phase.

To produce walking we need to have at least one foot on the ground. This is guaranteed by having the left foot be at point A (just striking the ground) when the right foot is at point B (just stepping off of the ground). The next requirement for walking is that the machine is propelled forward. If we look back at FIG. 9 we see the path of the foot relative to the rigid frame 12 or the body of the machine. When the foot is on the ground (i.e. between points A and B), if the foot is moving horizontally backward relative to the body of the machine, then the machine is moving horizontally forward relative to the foot. Because the foot is in contact with the ground, we can extend our observation to conclude that the body is moving horizontally forward relative to the ground. This only covers what happens while the foot is on the path between points A and B. However, recall that when one foot reaches point B, it lifts off of the ground, and the other foot (which is at point A) becomes the ground contact foot. Therefore, because the contact foot is always between points A and B, the motion of the machine relative to the ground must be horizontally forward.

This machine offers a significant advantage over other types of rough terrain walking machines that have been previously mentioned. It will be appreciated that this walking robot has only one powered degree of freedom and can traverse many different types of terrain. The simplicity of such a device allows it to be reliable and low, cost. It will also be appreciated that legged means of locomotion provides for a significant advantage over wheeled means enabling a wider range of terrain to be traversed.

Figure 8:
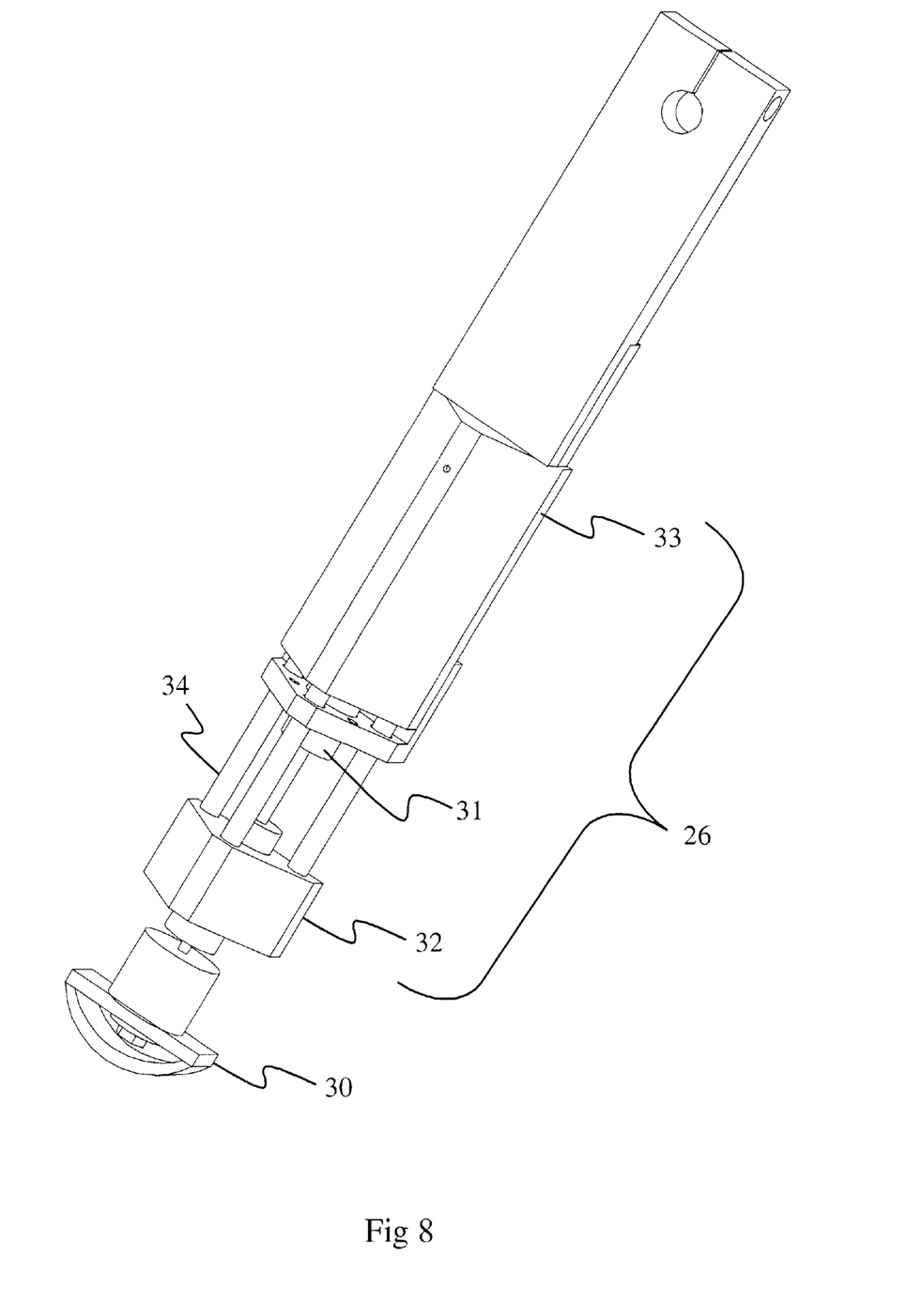
FIG. 8 is an isometric CAD drawing showing the shank leg assembly.

To reduce the vibrations transferred to the cargo and the operator a fluid filled shock absorber 31 is incorporated in the leg design. The shock absorber 31 provides damping and compliance to the relative motion between a bottom-half shank leg 32 and a top-half shank leg 33. Extending from bottom-half shank leg 32 are three slide-shafts 34. Drilled in top-half shank leg 33 are three corresponding holes. The three slide-shafts 34 fit into the holes of top-half shank leg 33. Top-half shank leg 33 and bottom-half shank leg 32 can only slide axially, relative to each other. The shock absorber 31 in FIG. 4 is mounted to the top-half shank leg 33. The other end of the shock absorber 31 contacts the bottom-half shank leg 32. The foot 30 is mounted to the end of bottom-half shank leg 32. The foot 30 has a rubber bottom surface, which provides increased traction with the ground.

From the above description, it will be apparent that the invention disclosed herein provides a novel and advantageous human assisted walking robot. The foregoing discussion discloses and describes merely exemplary methods and embodiments of the present invention. One skilled in the art will readily recognize from such discussions that various changes, modifications and variations may be made therein without departing from the spirit and scope of the invention. Accordingly, disclosure of the present invention is intended to be illustrative, but not limiting, of the scope of the invention, which is set forth in the following claims.

What is claimed is:

1. A mechanical transportation device comprising:
   a carrier member having a top side for supporting a load and an underside;
   a first leg member rotatably coupled to the underside of the carrier member;
   a second leg member rotatably coupled to the underside of the carrier member proximate to the first leg member and configured to move relative to the first leg member;
   a handle member for use by an operator to stabilize the device; and
   an onboard power unit for powering the first leg member and the second leg member to move relative to each other in a walking motion;
   wherein the walking motion provides locomotion for the transportation device; and
   wherein the transportation device is unstable without the support of the operator.

2. The device of claim 1 further comprising a stabilizing member having a distal end and a proximal end, the stabilizing member being mounted at the proximal end to the underside of the carrier member and having at least one wheel mounted on the distal end of the stabilizing member.

3. The device of claim 1 wherein the onboard power unit is an internal combustion engine.

4. The device of claim 1 wherein the said onboard power unit is an electric motor.

5. The device of claim 1 wherein the said onboard power unit is a hydraulic or a pneumatic actuator.

6. The device of claim 1 wherein each of the first and second leg members has two rigid links which pivot relative to each other, wherein one of the links is a thigh link and the other is a shank link.

7. The device of claim 1 further comprising a controller coupled to the power unit for controlling the device.

8. The device of claim 7 wherein the controller regulates the speed of the device.

9. The device of claim 7 wherein the controller is an electronic circuit.

10. The device of claim 7 wherein the controller is a microprocessor.

11. The device of claim 7 wherein the input to the controller is set by the operator via a transducer.

12. The device of claim 11 wherein the transducer is a multiple-pole switch allowing the operator to choose one of several input values.

13. The device of claim 11 wherein the transducer is capable of generating a continuous signal allowing the operator an infinite choice of input values.

14. The device of claim 8 further comprising a speed measuring apparatus to measure speed of the device for feedback to the controller.

15. The device of claim 1 further comprising a shock absorption element associated with the first and second leg members.

16. The device of claim 15 wherein the shock absorption elements are mounted in a shank link of each of the first and second leg members.

17. The device of claim 15 wherein the shock absorption elements consist of a spring.

18. The device of claim 15 wherein the shock absorption elements consist of a damper.

19. The device of claim 18 wherein the damper is a fluid damper.

20. A mechanical transportation device comprising:
   a carrier member having a top side for supporting a load and an underside;
   a first leg member coupled to the underside of the carrier member;
   a second leg member coupled to the underside of the carrier member proximate to the first leg member;
   a handle member for use by an operator to stabilize the device;
   wherein each of the first and second leg members has two rigid links which pivot relative to each other, wherein one of the links is a thigh link and the other is a shank link;
     a first thigh four-bar linkage coupled between the motor and the first thigh of the first leg member;

a first shank four-bar linkage coupled between the motor and the first shank of the first leg member;

a second thigh four-bar linkage coupled between the motor and the second thigh of the first leg member; and a second shank four-bar linkage coupled between the motor and the second shank of the first leg member;

wherein each of the four-bar linkages has a driver link, a coupler link, a rocker link and a ground link.

21. The device of claim 20 wherein rotation of the thigh link for the first and the second leg members is generated by the rocker links.

22. The device of claim 20 wherein rotation of the shank link for the first and second leg members is generated by the rocker links.

23. The device of claim 22 wherein the power transfer from the rocker links associated with the shank links is carried though a chain, a first sprocket and a second sprocket, the first sprocket being connected to a base of the shank links and the second sprocket being connected to a base of the rocker links.

24. The device of claim 22 wherein the power transfer from the rocker links associated with the shank links is carried though a timing belt, a first sprocket and a second sprocket, the first sprocket being connected to a base of the shank links and the second sprocket being connected to a base of the rocker links.

25. The device of claim 20 wherein the driver links of the four-bar linkages of the leg link are driven at the same input speed.

26. The device of claim 20 wherein the driver links are driven by the power unit through a transmission system.

27. The device of claim 26 wherein the transmission system is a gear box with at least one transmission ratio.

28. The device of claim 26 wherein the transmission system is a continuously variable transmission.

29. The device of claim 20 where the two driver links of the first leg are 180 degrees out of phase with the driver links of the second leg member.

30. The device of claim 26 where the power unit has a clutch to disengage a driving shaft from the transmission system.

31. The device of claim 20 further comprising:

a rigid frame wherein the rigid frame supports the power unit and the four ground links of the four-bar linkages.

32. The device of claim 31 wherein the rigid frame supports the transmission system.

33. The device of claim 31 wherein the carrier member is mounted on the rigid frame to carry loads.

34. The device of claim 31 further comprising two handles extending from the frame, wherein the handles are adapted to be used by an operator for stabilizing purposes.

35. The device of claim 34 wherein the output power from the power unit is assigned by the operator via an intermediary input apparatus between the operator and the power unit.

36. The device of claim 35 wherein the intermediary input apparatus is a mechanical system to control the position of an engine throttle where the power unit is an internal combustion engine.

37. An operator assisted, powered, transportation device comprising:

a motor;

a carrier;

a first leg member rotatably mounted to the carrier and coupled to the motor;

a second leg member rotatably mounted to the carrier and coupled to the motor; and a handle member for use by an operator to stabilize the device;

wherein the motor drives (moves) the first and second leg members relative to each other resulting in a walking motion;

wherein the walking motion provides locomotion for the transportation device; and wherein the transportation device is unstable without the support of the operator.

38. The device recited in claim 37 wherein the motor is an electric motor.

39. The device recited in claim 37 wherein the motor is an internal combustion engine.

40. The device recited in claim 37 wherein the first leg member has a first thigh link and a first shank link, and the second leg member has a second thigh link and a second shank link.

41. The device recited in claim 37 wherein rotational motion generated by the motor produces a walking motion by the first and second leg members.

42. The device recited in claim 37 further comprising a controller, wherein the controller regulates walking speed of the robot based on the input from an operator.

43. The device recited in claim 37 wherein the carrier is a cargo bin.

44. The device recited in claim 37 further comprising:

a stabilizing support member having a proximal and distal end, the stabilizing support member being mounted at the proximal end to the carrier and having a wheel rotatably mounted to the distal end.

45. An operator assisted, powered, transportation device comprising:

a motor;

a carrier;

a first leg member mounted to the carrier and coupled to the motor;

a second leg member mounted to the carrier and coupled to the motor;

a handle member for use by an operator to stabilize the device;

a first thigh four-bar linkage coupled between the motor and the first thigh of the first leg member;

a first shank four-bar linkage coupled between the motor and the first shank of the first leg member;

a second thigh four-bar linkage coupled between the motor and the second thigh of the first leg member; and a second shank four-bar linkage coupled between the motor and the second shank of the first leg member.

46. The device recited in claim 45 wherein rotational motion generated by the motor produces a walking motion by the first leg members via first thigh and shank four-bar linkages and a walking motion by the second leg via second thigh and shank four-bar linkages.

47. A powered, two-legged wheel barrow apparatus stabilized by an operator comprising:

a motor;

a wheel barrow body;

a first leg member rotatably mounted to the wheel barrow body and coupled to the motor; and a second leg member rotatably mounted to the wheel barrow body and coupled to the motor;

wherein the motor drives the first and second leg members relative to each other resulting in a walking motions wherein the walking motion provides locomotion for the wheel barrow;

wherein the wheel barrow apparatus has no more than two leg members; and wherein the wheel barrow is unstable without the support of the operator.

* * * * *